United States Patent [19]
Chu

[11] Patent Number: 5,860,447
[45] Date of Patent: Jan. 19, 1999

[54] IN LINE PRESSURE REGULATOR VALVE WITH PASSIVE PRESSURE RELEASE

[76] Inventor: David Chu, 1029 N. Fuller St., Santa Ana, Calif. 92701-4214

[21] Appl. No.: 644,357

[22] Filed: May 10, 1996

[51] Int. Cl.[6] .................................................. F16K 31/12
[52] U.S. Cl. .................................. 137/505.25; 137/493.8; 137/493.9
[58] Field of Search ............................... 137/505.25, 493, 137/493.9, 493.8

[56] References Cited

U.S. PATENT DOCUMENTS

| | | | |
|---|---|---|---|
| 1,356,579 | 10/1920 | Witman | 137/505.25 |
| 3,211,175 | 10/1965 | Replogle | 137/508 |
| 3,437,109 | 4/1969 | Darlson et al. | 137/505.25 |
| 3,685,533 | 8/1972 | Krechel | 137/505.25 |
| 3,848,631 | 11/1974 | Fallon | 137/505.25 |
| 4,119,088 | 10/1978 | Sim | 137/505.25 |
| 4,194,522 | 3/1980 | Lucas et al. | 137/505.25 |
| 4,300,592 | 11/1981 | Hartley | 137/505.25 |
| 4,785,847 | 11/1988 | Steer et al. | 137/508 |

*Primary Examiner*—Denise L. Ferensic
*Assistant Examiner*—Joanne Y. Kim
*Attorney, Agent, or Firm*—Donn K. Harms

[57] ABSTRACT

An in line fluid pressure regulating and pressure relief device having a regulator body with an axial bore therethrough with an inlet chamber conectable to a source of fluid under pressure and an outlet chamber connect able to a device requiring fluid under substantially constant pressure. A fluid pressure regulator located in the regulator body maintains fluid pressure at the outlet chamber at a constant predetermined level. A bleed piston located in the axial bore between the inlet chamber and to the pressure regulating means loses contact with said pressure regulating piston when the pressurized fluid source is removed from the regulator or drops below a certain level relieving substantially all pressure in said exit chamber and any attached device passively rendering the device inoperable.

13 Claims, 2 Drawing Sheets

IN LINE PRESSURE REGULATOR VALVE WITH PASSIVE PRESSURE RELEASE

BACKGROUND OF THE INVENTION

1. Field of the Invention

This invention relates to fluid pressure regulators used with mechanical or other devices requiring a regulated constant flow of fluid pressure for powering operation of the device. More particularly it relates to an in line pressure regulator for tools which both regulates the pressure received by the tool from a conventional fluid pressure source during operation, and, passively relieves leftover pressure inside the tool and regulator when the pressure regulator is disconnected from the pressure source or when the pressure source is turned and vented.

2. Prior Art

Pressure regulators are commonly used in the United States and throughout the world to regulate the pressure received by pneumatic and hydraulic tools for compressors or other pressure sources. Most such tools have an optimum range of operation for the pressurized fluid stream which provides them energy to operate. However, most compressors and other conventionally used pressurized fluid stream sources operate at fluid pressures above the optimum range required by the tool connected to them.

Common power tools such as pneumatic air hammers which drive nails into wood on construction sites, pneumatic staplers, and pneumatic and hydraulic saws used in construction, butcher shops, and even dentist offices, require a constant regulated fluid stream to operate effectively. Currently such a regulated pressurized fluid stream is maintained by a fluid pressure regulator located between the conventional pressurized fluid source and the connected tool.

There exists a common hazard with all such devices when connected to a source of compressed fluid. When the conventional source of the pressurized fluid is disconnected from the inlet side of a conventional pressure regulator, pressurized fluid remains in the tool and on the regulated exit side of the regulator. The disconnection from the fluid source thus provides a false sense of security to the user because the tool, having a pressurized fluid source still available in the regulator and the tool itself, is still capable of operation for another cycle if the tool trigger is activated.

Many a carpenter has been seriously injured by an "unloaded" nail gun thinking that the tool would not operate after it was disconnected from a compressor line. Severe injury has also been caused by the operation of rotary saws and drills which will also operate for a short time on the reservoir of pressurized fluid that exists between the outlet of current regulators and the tool itself.

There are a number of approaches advanced in prior art which address either the safety disconnect issue or the pressure regulating requirements. However, prior art fails to address both requirements leaving a constant hazard to users of such devices.

U.S. Pat. No. 4,253,683, Jentsch et al., teaches a safety bleed stop hose coupling for pneumatic tools. Jentsch notes the extreme hazard to tool users who disconnect the tool from a pressurized line feeding the tool. If the line is disconnected while under pressure the line can seriously injure the user. Jentsch solves this problem with a telltale hiss sound alerting the user to the pressure still contained in the line. The user therein can activate a bleed valve to release the pressure and then disconnect the tool. However, Jentsch offers no pressure regulation means and requires an affirmative action by the user to release the pent up pressure in the line which is easily forgotten on a busy job site.

U.S. Pat. No. 3,524,465, Sadler, teaches an in line pressure regulation device wherein pressure received on the inlet side is transferred to the outlet side and excess pressure beyond a predetermined point is relieved through a bleed valve. However, Sadler in operation would still allow pressure at the predetermined amount to stay in the tool used and the outlet side of the regulator upon release of pressure feeding the inlet. Thus, while the tool received pressurized fluid at a predetermined amount, that pressure is not released upon disconnecting from the source and poses an extreme hazard to tool users who unaware that the tool will still operate.

Pressure regulation is also taught in U.S. Pat. No. 5,222,518 Fisher et al. Fisher however addresses only the problem of excess pressure in lines caused by excess pressure from the source or a blockage of a return line in a hydraulic system. Fisher does not allow for the release of line pressure upon disconnecting from a pressure source and is not intended to be a constant pressure regulation device.

Safety in the control of a power tool is addressed in U.S. Pat. No. 3,970,110 Schaedler et al. Schaedler teaches a safety switch at the trigger of a power tool which must be concurrently activated with a separate trigger switch to allow operation of the tool. However, Schaedler does not allow for constant fluid pressure regulation or passive release of pressure upon disconnecting from the pressure source. Thus the tool may operate if the user concurrently activates the safety and the trigger using pressure stored in the tool even if disconnected from a power source.

Another method of addressing the safety concerns in power tools is advanced by U.S. Pat. No. 4,794,273 McCullough et al. MuCullough teaches and electronic sensing means which monitors the users grasping of the tool and power supply line. If the user grasps both the tool and the supply line, the electronic sensing means will allow the tool to operate upon activation of the trigger by the user. However if the supply line is not held at the same time as the tool, the electronic sensing means will not allow the tool to operate. Once both the tool and the supply line are released by the operator, the electronic sensing means de-energizes the tool. MuCullough however requires the use of a complicated electronic sensing means which would not fare well in the rough use of construction workers and it provides no pressure regulation means.

There thus exists the need for an in line fluid pressure regulating device providing fluid at a relatively constant predetermined pressure which also provides the safety of passive release of the pressurized fluid left in the regulation device and in the connected tool operated by the pressurized fluid.

SUMMARY OF THE INVENTION

In summary, the present invention comprises an in line fluid pressure regulator which can provide pressurized fluid to a pressure driven tool at a constant a predetermined level. The invention concurrently provides for the passive release of pressurized fluid remaining in a pressure regulator device and the attached tool after the source of pressure is removed or is lowered below a predetermined point at the inlet side of the pressure regulation invention.

One preferred embodiment of the invention features threaded inlet and outlet apertures in the regulator body of the invention. Conventional hoses or lines carrying pressurized fluid from a conventional source such as a compressor or pump are attached to an inlet aperture in the regulator body in communication with the inlet chamber in the regulator body to supply pressurized air to the invention using conventional hose fittings. A hose or line is attached to an aperture in the regulator body in communication with an outlet chamber in the regulator body at one end, and to the tool using the pressurized air or fluid at the distal end of the hose. A central axial bore through the body of the invention communicates with the inlet and outlet chambers.

In operation a pressure regulating piston biased in the chamber maintains the fluid at a constant pressure which is determined by the force of the biasing means used. A pressure relief or bleed piston is biased to communicate with the regulating piston while pressure in the fluid is maintained above a predetermined level at the inlet aperture from the force provided by the pressurized air source against the bleed piston. Once pressure at the inlet aperture is released or lowered below the tool fluid pressure on the outlet chamber side of the invention, the bleed piston separates from the regulating piston breaking the seal formed between both pistons. Pressurized fluid from the tool is vented through the axial bore in the regulator body and back into the inlet line or to the atmosphere though the inlet aperture. Absent the higher inlet pressure provided by a pressurizing means against the bleed piston it is incapable of a sealing contact with the regulating piston rendering the outlet chamber and tool incapable of maintaining pressurized fluid therein.

Another preferred embodiment of the invention for use with hydraulic tools features the same inlet and outlet apertures communicating with a central bore. Also, in communication with the central bore would be a bleed aperture. Upon the lowering of the pressure of the fluid at the inlet aperture below that of the pressure maintained in the tool on the outlet side of the invention, the pressure on the outlet side would be vented to the bleed aperture by the separation of the contact between the regulating piston and the pressure relief piston.

It is an object of this invention to provide an in line pressure regulator which maintains a relatively constant pressure in a pressurized fluid supplied through the pressure regulator to tools and machinery operated by pressurized fluid at a relatively constant pressure.

Another object of this invention is to provide a safety to users of power tools by allowing for the passive release of the pressure in a tool using pressurized fluid once the pressure source is removed or lowered.

A further object of this invention is to provide both pressure regulation of pressurized fluid as well as safety release of the pressurized fluid in one invention.

An additional object of this invention is to allow for the easy in line mounting of a pressure regulation means on lines providing pressurized fluid to power tools.

Another object of this invention is to provide a tamper proof pressure regulation means for pressurized fluid used to power tools by the enclosure of the pre determined pressure regulation means inside of the invention in a permanently sealed condition thus allowing no adjustment by the user to higher or lower pressures to the tool using the pressurized fluid.

Further objects of the invention will be brought out in the following part of the specification, wherein detailed description is for the purpose of fully disclosing the invention without placing limitations thereon.

BRIEF DESCRIPTION OF DRAWING FIGURES

Figure 4:
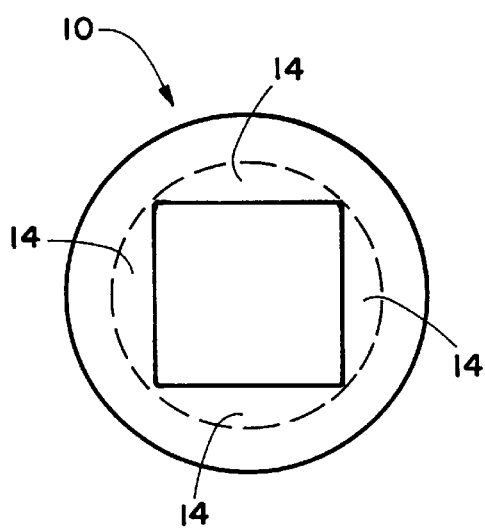

FIG. 4 is view of the invention from the inlet end showing the regulator body and axial bore in phantom line and viewing the inlet side of the pressure release valve in floating contact with the axial bore. The inlet end of the pressure release valve is shaped to form apertures to allow a predetermined amount of pressurized fluid to pass through the aperture(s) formed by the outside edges of the pressure release valve and the inside wall of the axial bore.

Figure 5:
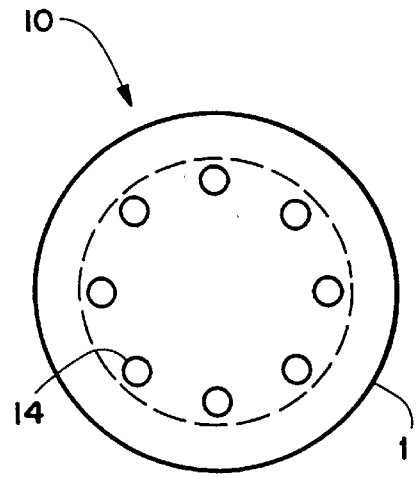

FIG. 5 is view of the invention from the inlet end showing the regulator body and axial bore in phantom line and viewing the inlet side of the pressure release valve in floating contact with the axial bore. The inlet end of the pressure release valve has apertures therein.

DETAILED DESCRIPTION OF A PREFERRED EMBODIMENT OF THE INVENTION

Figure 1:
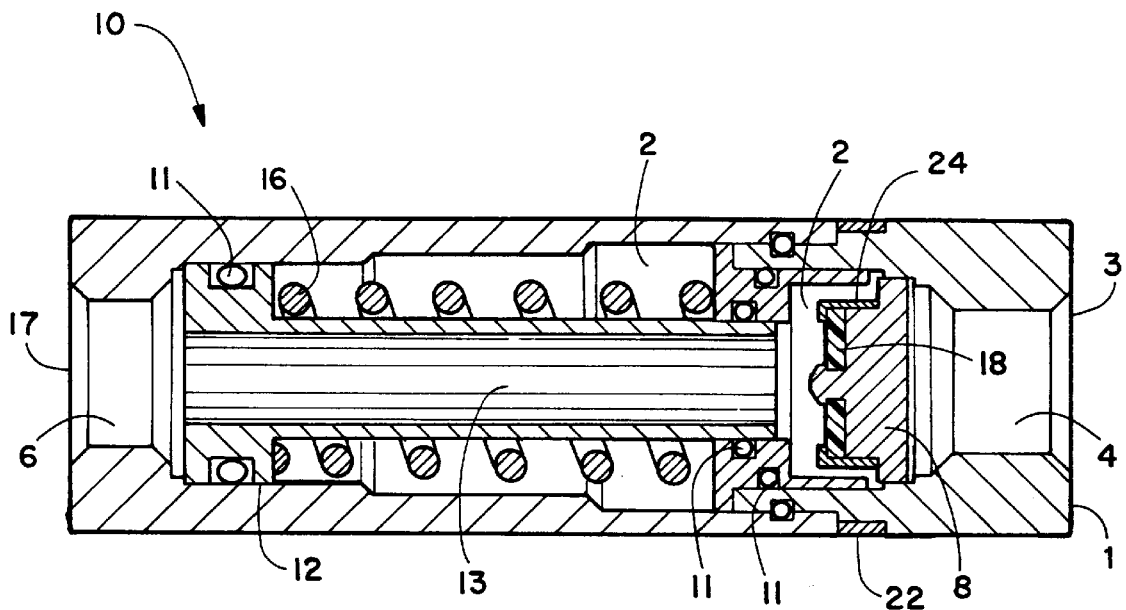
FIG. 1 is side view of the invention showing the interior of the regulator body having an axial bore therethrough and having a pressure relief valve in the unpressurized position.

Referring now to the drawing figures:

FIG. 1 shows the in line fluid pressure regulating and passive pressure release invention 10 in a resting or non pressurized state showing the regulator body with an axial bore therethrough. An inlet chamber 4 is located at one end of the regulator body 1. An aperture 3 located in the regulator body 1 communicates the inlet chamber and the hose (not shown) or other conventional attachment to a conventional fluid pressurizing device (not shown) such as an air compressor. An outlet chamber 6 is located at the opposite end of the regulator body 1 from the inlet chamber 4. The outlet chamber 6 communicates with the hose or tool needing pressurized fluid via an aperture in the regulator body 1. The regulator body 1 can be made of any material sufficient to withstand the internal pressure that develops such as aluminum, steel, brass, bronze, or strong plastic. As shown in the drawings, the current best embodiment of the invention has a regulator body 1 which is constructed of two pieces held together by a snap ring 22. However other methods of manufacture could yield a regulator body of one or more pieces depending on the machinery used and techniques used for the manufacture of the components.

In use, the inlet chamber 4 of the regulator body 1 is attached to any conventional pressurized fluid source such as an air compressor or fluid pump. Attachment of a pressurized fluid source is generally accomplished by attaching a hose or pipe between the pressurized fluid source and the inlet chamber 4 of the invention using industry standard fittings to attached to the aperture 3 communicating with the inlet chamber 4 of the invention. A bleed piston 8 is shown in its un pressurized position slidably positioned within the axial bore in the regulator body 1. As pictured the bleed piston 8 is in a portion of the axial bore formed by three components held together by a snap ring together forming the body and interior axial bore 2. However, different manufacturing techniques could yield different sized and shaped components. The pressure regulation piston 12 is shown at rest in a biased position toward the outlet chamber 6 of the regulator body 1 and is held in this biased position by a biasing means 16 such as a spring. Both the bleed piston 8, and the pressure regulating piston 12, can be machined, cast, or molded, from any material that will withstand the friction against the axial bore 2 of the regulator body 1 such as aluminum, steel, brass, bronze, or plastic. Currently aluminum is being used. The outside diameters of portions of both the bleed piston 8 and the pressure regulating piston 12 would be machined to a tolerance to allow them to slide properly in the axial bore 2 and maintain an operating seal thereon. The axial bore 2 as shown in the current embodiment is cut to accept, in an operational manner, both the regulating piston 12 and the bleed piston 8 in a cooperating fashion. The shape of the axial bore 2 and both the bleed piston 8 and the pressure regulating piston 12 could change if the three components making up the body of the invention change to a different shape or number so long as all the parts configured to operate in a functional and cooperative sealing relationship. Such changed shapes of would occur for different applications and due to different manufacturing techniques such as molding, injection molding or machining of the components themselves.

Conventional rubber, nylon, or other conventional natural or synthetic "o" ring seals 11 are shown located about the pressure regulation piston 12 and upon the interior of the axial bore 2 to maintain operating seals for the channelization of pressurized fluid properly through the invention. However these seals may be located in differing positions as required by the pressure levels needed in the supplied tool or differing shapes of the axial bore 2 in its functional relationships with either or both of the regulating piston 12 and the bleed piston 8 as needed.

Figure 2:
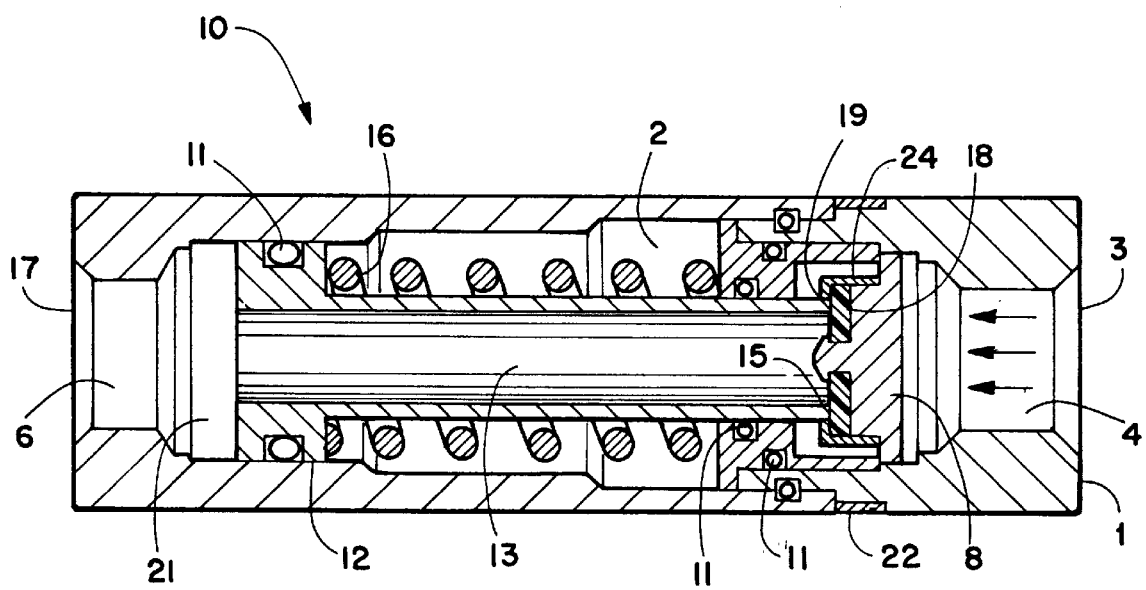
FIG. 2 is a side view of the invention in a pressurized state showing the regulator body having an axial bore therethrough and having a pressure relief valve in a pressurized condition.

FIG. 2 depicts side view of the in line fluid pressure regulating and passive pressure release invention 10 in a working or pressurized state. In this state the regulator body 1 would be attached to a conventional pressurized fluid source (not shown) such as a conventional air compressor or fluid pump at the inlet chamber 4 side of the regulator body 1. A tool (not shown) such as a conventional nail gun or pneumatic saw requiring a constant level of pressurized fluid would be connected to the outlet chamber 6 located at the opposite end of the regulator body 1 from the inlet chamber 4. Both the inlet chamber and outlet chamber apertures would be configured to attach to industry standard hoses and fittings.

In use, pressurized fluid from a conventional air compressor (not shown) or a hydraulic pump (not shown) would enter the inlet chamber 4 of the regulator body 1 from a conventional hose (not shown) or pipe (not shown). The bleed piston 8 is configured in such a manner as to contact the inside circumference of the inlet chamber 4 such that one or more apertures 14 are formed between the outside diameter of one end of the bleed piston 8 and the inside circumference of the communicating inlet chamber 4. Pressurized fluid entering the inlet chamber 4 will bias the bleed piston 8 toward the outlet chamber side of the regulator body 1 and thereafter the fluid will flow through into the axial bore 2 in the regulator body the apertures into the central bore 13 in the pressure regulating piston 12 and to the tool connected to the outlet chamber 6. Pressure build up created in the outlet chamber 6 will at a predetermined pressure exert sufficient force on the pressure regulating piston 12 so as to overcome the bias created by the biasing means 16 and force the regulating piston 12 to contact one end of the bleed piston creating a cooperative releasable seal 19 between the inlet aperture of the regulating piston 15 and the face or sealing washer 18 on the bleed piston. Regulated pressure levels can be fine tuned using shims or washers 21 to compress the biasing spring 16. The sealing washer 18 can be made from any material which will withstand the continual interruptible contact between thee pressure regulating piston 12 and the bleed piston 8. Materials such as rubber, neoprene, polypropylene, nylon, polyethylene, mixtures thereof, or other conventionally used sealing materials would be acceptable materials for the seal 18. However, the seal 18 may be eliminated if a reasonably operational releasable seal can be achieved between the face of the bleed piston 8 and the fluid inlet side of the pressure regulating piston 12 at their mutual communication point.

The contact between the inlet aperture 15 side of the pressure regulation piston 12 and the face of the bleed valve 8 or as needed, a seal 18 thereon, creates a releasable cooperating seal which shuts off the flow of pressurized fluid into the inlet aperture 15 of the regulating piston 12 and to the outlet chamber 6 until such time as the pressure in the fluid drops below a predetermined desired point. Use of the tool to do work or leaks of pressure at the tool and hose connection will drop the pressure on the exit side of the regulator invention. Once the pressure drops to the predetermined desired pressure, the regulating piston 12, biased by a spring or other means, separates the inlet aperture side of the piston from the bleed piston face or seal 18 permitting the flow of pressurized fluid from the axial bore interior of the body of the regulator to the outlet chamber 6 until such time as the predetermined desired pressure again shuts off the flow. In this manner, a pressure regulating means is constructed and the tool is supplied with a constant pressurized fluid flow at pressure determined by the force of a biasing means 16 such as a spring, against the regulating piston 12.

Figure 3:
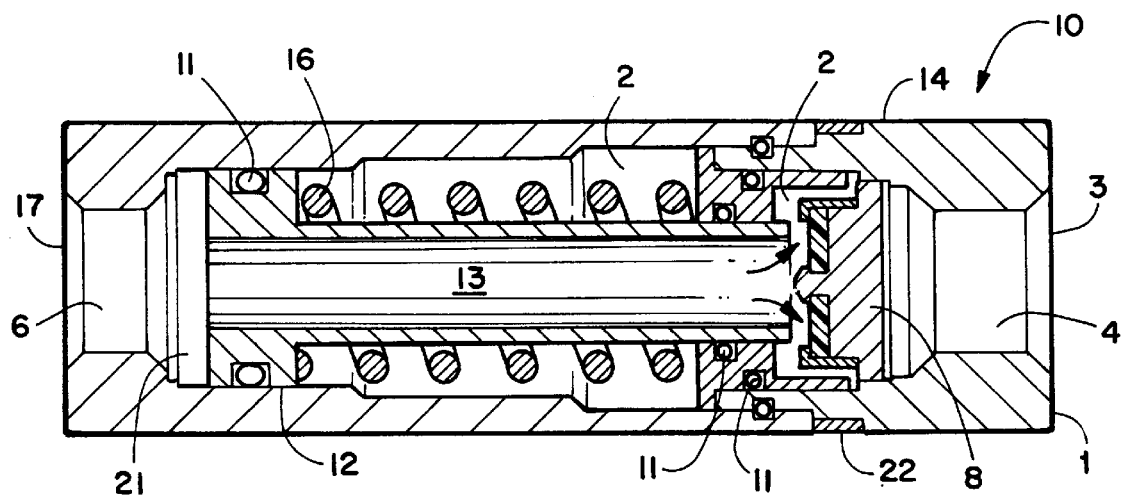
FIG. 3 is a side view of the invention at the point the pressure generation means is removed from the inlet side of the regulator body.

FIG. 3 depicts side view of the in line fluid pressure regulating and passive fluid pressure release invention 10 at the time of disconnection from or substantial lowering of pressure of the pressurized fluid source or a de pressurizing state. In this state the regulator body 1 would be detached from the pressurized fluid source at the inlet chamber 4 side of the regulator body 1 or by removal of the hose supplying the regulator with pressurized air from the compressor.

Detachment from the pressurized fluid source creates lower fluid pressure in the inlet chamber 4 than exists in the outlet chamber 6 and attached tool. Pressurized fluid from the outlet chamber 6 would flow back through the central bore of the regulating piston 12 into the axial bore 2 wherein it would force the bleed piston 8 away from the regulating piston 12 to a position wherein it cannot form a seal with the inlet side of the regulating piston 12. The pressurized fluid is then vented through the aperture 14 at the inlet side of the bleed piston and out the inlet chamber 4 thus creating a passive pressure relief means for the dangerous leftover pressure in the tool attached to the outlet chamber 6 and eliminating the chance of injury from the "unloaded" tool cycling through another operation using leftover fluid pressure.

FIG. 4 is an inlet aperture 3 end view of the regulator body 1 in phantom line showing the bleed piston 8 shaped at its outside diameter such that apertures 14 are formed between the wall of the axial bore of the regulator body 1 and the outside diameter of the bleed piston 8.

FIG. 5 is another inlet end view of different style apertures 14 located in the bleed piston at the inlet chamber side of the regulator body. Incoming pressurized fluid would travel through the apertures in the bleed valve to the center portion of the axial bore concurrently forcing the bleed piston 8 toward the pressure regulating piston 12 at a calculated force determined by the provided pressurized fluid minus the flow through the apertures.

While all of the fundamental characteristics and features of the in line pressure regulator valve with passive pressure relief invention have been shown and described, it should be understood that various substitutions, modifications, and variations may be made by those skilled in the art without departing from the spirit or scope of the invention. Consequently, all such modifications and variations are included within the scope of the invention as defined by the following claims.

What is claimed is:

1. An in line fluid pressure regulating and release apparatus comprising:

a regulator body having an axial bore therethrough; an inlet chamber communicating with a first end of said axial bore said inlet chamber connectable to a means for generating pressurized fluid;

an outlet chamber communicating with a second end of said axial bore, said outlet chamber connectable to a device requiring said pressurized fluid at a substantially constant pressure;

a fluid pressure regulation means having an inlet end for receiving said pressurized fluid and communicating said pressurized fluid therethrough to said outlet chamber at a substantially constant pressure, said fluid pressure regulating means located in said axial bore adjacent to said outlet chamber, a fluid pressure relief means slidably located in said axial bore between said inlet chamber and said fluid pressure regulation means;

said fluid pressure relief means having a biased position wherein said fluid pressure relief means is biased toward said fluid pressure regulation means when fluid pressure communicated to said fluid pressure relief means from said inlet chamber exceeds fluid pressure communicated to said fluid pressure relief means from said outlet chamber;

a cooperative releasable seal formed between said pressure relief means and said pressure regulation means, said cooperative releasable seal capable of formation only when said pressure relief means is in said biased position, said cooperative releasable seal being required to maintain the flow of said pressurized fluid through said fluid pressure regulation means to said outlet chamber at said substantially constant pressure, and, said fluid pressure relief means having bleed position incapable of forming said cooperative releasable seal when fluid pressure communicated thereto from said outlet chamber exceeds fluid pressure from said inlet chamber whereby fluid pressure from said inlet chamber will flow to said outlet chamber at a substantially constant pressure when fluid pressure in said inlet chamber is higher than said outlet chamber and fluid pressure in said outlet chamber and any device connected thereto is passively vented through said inlet chamber when said pressure generating means is removed therefrom.

2. The fluid pressure regulating apparatus as defined in claim 1 wherein said fluid pressure regulation means comprises:

a pressure regulating piston axially moveable toward and away from said outlet chamber;

an inlet aperture and an exit aperture communicating through a central bore in said regulating piston through which pressurized fluid can flow from said central bore through said inlet aperture to exit at said exit aperture to said outlet chamber;

a cooperative releasable seal for ceasing the flow of pressurized fluid through said inlet aperture which is formed by the communication of said inlet aperture with one end said fluid pressure relief means when fluid pressure in said outlet chamber reaches a predetermined level sufficient to force said pressure regulating piston towards said fluid pressure relief means releasably sealing said inlet aperture, and, a biasing means for biasing said pressure regulating piston towards said outlet chamber at a predetermined force sufficient to release said cooperative releasable seal when fluid pressure in said outlet chamber falls below a predetermined level whereby pressurized can flow through said inlet aperture exiting at said exit aperture until fluid pressure in said outlet chamber reaches a predetermined level sufficient to reset said cooperative releasable seal.

3. The fluid pressure regulating apparatus as defined in claim 1 wherein said fluid pressure relief means comprises:

a bleed piston slidably located in said axial bore having a first end adjacent to said inlet chamber and a second end adjacent to said pressure regulating piston;

at least one aperture located at said first end of said bleed piston allowing pressurized fluid from said inlet chamber to bypass said bleed piston into said central bore, said bleed piston moveable to a first position capable of releasable contact at said second end of said bleed piston with the adjacent end of said pressure regulating piston when the fluid pressure level in said inlet chamber is higher than the fluid pressure level in said outlet chamber;

said bleed piston moveable to a second position out of contact with said pressure regulating piston when said fluid pressurizing means is disconnected from said inlet chamber whereby remaining fluid pressure in said outlet chamber and any attached device is vented through the inlet chamber.

4. The fluid pressure regulating apparatus as defined in claim 1 wherein said fluid pressurizing means is an air compressor.

5. The fluid pressure regulating apparatus as defined in claim 2 wherein said biasing means is a spring.

6. The fluid pressure regulating apparatus as defined in claim 3 wherin said aperture located at said first end of said bleed piston is formed by the inside wall of said axial bore and the outside diamater surface of said first end of said bleed piston.

7. The fluid pressure regulating apparatus as defined in claim 3 wherein said second end of said bleed piston has a sealing washer located theron made from a material selected from the group consisting of rubber, neoprene, nylon, polypropryhlene, silicone, vinyl and polyethylene and mixtures or combinations thereof.

8. The fluid pressure regulating apparatus as defined in claim 1 wherein said fluid pressure regulation means comprises:

a pressure regulating piston axially moveable toward and away from said outlet chamber;

an inlet aperture and an exit aperture communicating through a central bore in said regulating piston through which pressurized fluid can flow from said central bore through said inlet aperture to exit at said exit aperture to said outlet chamber;

a cooperative releasable seal for ceasing the flow of pressurized fluid through said inlet aperture which is formed by the communication of said inlet aperture with one end said fluid pressure relief means when fluid pressure in said outlet chamber reaches a predetermined level sufficient to force said pressure regulating piston towards said fluid pressure relief means releasably sealing said inlet aperture, and, a biasing means for biasing said pressure regulating piston towards said outlet chamber at a predetermined force sufficient to release said cooperative releasable seal when fluid pressure in said outlet chamber falls below a predetermined level whereby pressurized can flow through said inlet aperture exiting at said exit aperture until fluid pressure in said outlet chamber reaches a predetermined level sufficient to reset said cooperative releasable seal.

9. The fluid pressure regulating apparatus as defined in claim 1 wherein said fluid pressure relief means comprises:

a bleed piston slidably located in said axial bore having a first end adjacent to said inlet chamber and a second end adjacent to said pressure regulating piston;

at least one aperture located at said first end of said bleed piston allowing pressurized fluid from said inlet chamber to bypass said bleed piston into said central bore, said bleed piston moveable to a first position capable of releasable contact at said second end of said bleed piston with the adjacent end of said pressure regulating piston when the fluid pressure level in said inlet chamber is higher than the fluid pressure level in said outlet chamber;

said bleed piston moveable to a second position out of contact with said pressure regulating piston when said fluid pressurizing means is disconnected from said inlet chamber whereby remaining fluid pressure in said outlet chamber and any attached device is vented through the inlet chamber.

10. The fluid pressure regulating apparatus as defined in claim 1 wherein said means for generating pressurized fluid is an air compressor.

11. The fluid pressure regulating apparatus as defined in claim 8 wherein said biasing means is a spring.

12. The fluid pressure regulating apparatus as defined in claim 9 wherein said aperture located at said first end of said bleed piston is formed by the inside wall of said axial bore and the outside diameter surface of said first end of said bleed piston.

13. The fluid pressure regulating apparatus as defined in claim 9 wherein said second end of said bleed piston has a sealing washer located thereon made from a material selected from the group consisting of rubber, neoprene, nylon, polyproprylene, silicone, vinyl and polyethylene and mixtures or combinations thereof.

* * * * *